United States Patent [19]

Shefford

[11] 4,348,436

[45] Sep. 7, 1982

[54] ENCLOSURE MEMBER SUBSTANTIALLY IMPERMEABLE TO THE TRANSMISSION OF SOLVENTS AND FUELS

[75] Inventor: Roger A. Shefford, Aldershot, England

[73] Assignee: Koninklijke Emballage Industrie Van Leer B.V., Amstelveen, Netherlands

[21] Appl. No.: 214,623

[22] Filed: Dec. 10, 1980

[30] Foreign Application Priority Data

Feb. 12, 1980 [GB] United Kingdom ................. 8004570

[51] Int. Cl.$^3$ .......................... B65D 1/00; B05B 5/02
[52] U.S. Cl. .................................... 428/35; 428/215; 428/523; 428/689; 428/461; 427/400; 427/255.2; 427/255.3; 427/255.4; 220/455; 220/456
[58] Field of Search ................. 428/35, 215, 216, 689, 428/523, 461; 427/400, 255.1, 255.2, 255.3, 255.4

[56] References Cited

U.S. PATENT DOCUMENTS 3,684,554  8/1972  Donald et al. ...................... 427/400

Primary Examiner—P. Ives
Attorney, Agent, or Firm—Brumbaugh, Graves, Donohue & Raymond

[57] ABSTRACT

The present application relates to enclosure members consisting essentially of solid, non-aromatic polymers that have a linear carbon to carbon backbone structure and having a plurality of free hydrogen atoms attached to the carbon atoms with a permeability to wet solvents and fuels of less than 1/7, optionally less than 1/40 of the permeability of untreated enclosure members having a thickness of 1 mm. Said low permeability is due to the presence of a layer of an iron phenanthroline complex on at least the inner surface of said enclosure members, having a portion of the hydrogen atoms replaced by sulfonic acid or sulfonate groups.

8 Claims, No Drawings

ENCLOSURE MEMBER SUBSTANTIALLY IMPERMEABLE TO THE TRANSMISSION OF SOLVENTS AND FUELS

The present invention relates to an enclosure member substantially impermeable to the transmission of solvents and fuels consisting essentially of solid, non-aromatic polymers that have a linear carbon to carbon backbone structure and have a plurality of free hydrogen atoms attached to the carbon atoms, the enclosure having an inner and outer surface, at least the inner surface having a portion of the hydrogen atoms replaced by sulfonic acid groups and a process for preparing it.

Generally the above type of enclosure members have excellent properties, being light in weight, strong, resistant to impact and unaffected by a wide range of chemicals. However, polyethylene, for example, has inherently a high permeability to many organic solvents, paticularly hydrocarbons and chlorinated hydrocarbons. This has prevented them from being used extensively in, for example, petrol tanks for vehicles or shipping containers where these solvents are present in the product to be packed.

Several methods of reducing said permeability are known and one of the most successful of these is to sulfonate the surface of the container by treatment with sulfur trioxide and neutralize the sulfonic acids formed on the polyethylene surface. See, for example U.S. Pat. Nos. 2,793,964, 3,613,957 and 3,740,258.

Although the permeability for dry solvents is much reduced by means of sulfonation it has been found that a sulfonated surface will loose the barrier properties achieved, if it is in contact with a solvent that contains a significant proportion of water for a period of some days. If such a sulfonated polyethylene surface is in contact with a wet solvent for some weeks the permeability may rise to an unacceptable level.

The effect of water in various solvents on the permeability of sulfonated polyethylene is shown in Table A. Solvents which permeate at a faster rate appear to be affected by water to a greater extent.

TABLE A

The effect of water in different solvents on the permeability of sulfonated polyethylene bottles after 6 weeks storage at 20° C.

| | Permeability (g/mm/m$^2$/day) | |
|---|---|---|
| | sulfonated | untreated |
| xylene | 0.6 | 20 |
| xylene + 1% water | 5.0 | 20 |
| petrol | 0.9 | 28 |
| petrol + 1% water | 3.0 | 28 |
| iso octane | 0.1 | 1.4 |
| iso octane + 1% water | 0.1 | 1.4 |
| petroleum ether | 0.3 | 11 |
| petroleum ether + 1% water | 0.6 | 11 |

It has been found that actinic radiation, i.e. sunlight, affects the color of sulfonated polyethylene. This explains why sulfonated polyethylene surfaces are affected by light when it is subjected to daylight behind a glass window. Contact of a sulfonated polyethylene surface in daylight with water promotes synergistically a deterioration of said sulfonated polyethylene surface. Probably such a surface is degraded by either water and/or light and residues absorbed by the liquid.

The decoloration of sulfonated polyethylene by daylight may be eliminated by using a polyethylene that contains a black pigment and/or dye stuff. When exposed to daylight black polyethylene is less sensitive to the above effect than a natural polyethylene, as can be seen from Table B which relates the effect to increases, and therefore deterioration, in permeability properties.

TABLE B

Permeability of sulfonated polyethylene bottles to xylene - the effect of water in the xylene and daylight after 6 weeks storage at 20° C.

| | | Color of | Permeability (g mm/m$^2$/day) | |
|---|---|---|---|---|
| Treatment | Situation | bottle | xylene | xylene + 1% H$_2$O |
| Sulfonated | Daylight | Natural | 0.6 | 9.8 |
| | | Black | 0.3 | 4.1 |
| Sulfonated | Dark | Natural | 0.3 | 3.6 |
| | | Black | 0.4 | 3.7 |
| Untreated | Daylight | Natural | 17 | 17 |
| | | Black | 20 | 22 |

It has been observed that water or light separately reduce the concentration of sulfonate groups at the surface of a sulfonated polyethylene by about 30% in 15 weeks. Water and light together reduce the sulfur concentration to zero in that time.

Even when a sulfonated polyethylene surface is not in contact with liquid, the presence of a solvent vapor or water vapor in the atmosphere will reduce the concentration of sulfonate groups if the samples are in daylight. However, in the absence of light the concentration is not significantly changed, as appears from Table C.

TABLE C

Effect of sunlight and atmosphere on the sulfur concentration of sulfonated polyethylene.

| | Sulfur concentration (g/m$^2$) after 6 weeks storage at 20° C. | |
|---|---|---|
| | in daylight | in darkness |
| Dry air | 0.9 | 1.0 |
| Saturated water vapor | 0.2 | 0.8 |
| Saturated xylene vapor | 0.3 | 1.0 |

It was found, that enclosure members consisting essentially of solid, non-aromatic polymers that have a linear carbon to carbon backbone structure and having a plurality of free hydrogen atoms attached to the carbon atoms with a permeability to wet solvents and fuels of less than 1/7, optionally less than 1/40, of the permeability of untreated enclosure members having a thickness of 1 mm, may be obtained by subjecting at least the inner surface thereof having a portion of the hydrogen atoms replaced by sulfonic acid or sulfonate groups to a treatment with an aqueous solution comprising ferrous sulfate and phenantroline, both in a concentration of at least 0.05 weight % at 20° C., at which at least a part of the cations of said surface has been replaced by said iron-phenantroline complex.

Preferably a mixture of a one weight % aqueous solution of ferrous sulfate and a one weight % aqueous solution of phenantroline is used.

EXAMPLE 1

Polyehylene Samples

A number of bottles were blow moulded by BP Chemicals Ltd. from their Rigidex 00255.

Sulfonation

The bottles were dried by passing dry air or nitrogen (less than 2 ppm water) through the bottle. Dry air or nitrogen containing 15 volume % SO$_3$ was then passed into the bottle until it had replaced the original air or nitrogen. After leaving the vapor in the bottle for 2 minutes, it was removed by blowing dry air or nitrogen through the bottle for a few minutes. If neutralization with ammonia gas was required, this was then passed through the bottle, and blown out with air. Any remaining sulfur trioxide and/or ammonia was washed out with water. Where required neutralization with 5% ammonium hydroxide was carried out at this stage, and the bottle washed again and allowed to dry at ambient temperature.

The permeability was measured by filling the bottle with xylene sealing the top and weighing the sealed bottle. The bottle was stored at ambient temperature until a steady weight loss was recorded. A similar test was conducted on another bottle with 1 weight % water added to the xylene.

| | |
|---|---|
| Permeability to dry xylene | 0.2 g mm/m$^2$/day |
| Permeability to xylene + 1 weight % water | 6.2 g mm/m$^2$/day |
| Permeability of unsulfonated bottle to dry xylene | 20 g mm/m$^2$/day |

EXAMPLE 2

Two bottles were treated as described in Example 1. Two further bottles were treated similarly except that after the sulfur trioxide had been flushed out with dry nitrogen the polyethylene surface was neutralized by passing ammonia gas into the bottle. This was then removed with nitrogen and the bottles washed and dried. One bottle of each type was treated further as described below.

A solution was made by mixing a 1 weight % aqueous solution of ferrous sulfate and a 1 weight % aqueous solution of phenanthroline. The two bottles were filled with this solution and emptied after a few minutes. They were then rinsed with water and dried.

The permeability of all four bottles to xylene+1 weight % water was then measured as in Example 1 with the results shown in Table D.

TABLE D

| Post Treatment | Permeability (g mm/m$^2$/day) | |
|---|---|---|
| after Sulfonation | Aqueous Ammonia | Aqueous Gas |
| None | 3.2 | 5.1 |
| Washed with iron phenanthroline complex | 1.0 | 0.5 |

EXAMPLE 3

Several bottles were sulfonated as described in Example 1. The surface was either neutralized with aqueous ammonia, ammonia gas or in some cases not at all. The post treatment was as described in Example 2 but the time allowed for the reaction and the temperature of the solution were varied. The permeability to xylene containing 1 weight % water is shown in Table E.

TABLE E

| | Permeability (g mm/m$^2$/day) | | |
|---|---|---|---|
| Time and Temperature of post treatment | Unneutralized | Aqueous Ammonia | Ammonia Gas |
| 20° C./2 minutes | 1.0 | 1.7 | 1.4 |
| 20° C./30 minutes | 1.0 | 0.5 | 0.4 |
| 50° C./2 minutes | 0.9 | 1.0 | 1.2 |

EXAMPLE 4

Several polyethylene bottles were modified as described in Example 3 using ammonia gas to neutralize the sulfonated surface. The reaction time was maintained at 2 minutes at 20° C. but the concentrations of ferrous sulfate and phenanthroline were varied. The results of permeability tests using xylene containing 1 weight % water are shown in Table F.

TABLE F

| Concentration of FeSO$_4$ (weight %) | Concentration of phenanthroline (weight %) | Permeability (g mm/m$^2$/day) |
|---|---|---|
| 0.05 | 0.05 | 3.2 |
| 0.2 | 0.2 | 1.6 |
| 0.2 | 0.5 | 2.8 |
| 0.5 | 0.2 | 1.7 |
| 0.5 | 0.5 | 1.4 |

I claim:

1. An enclosure member substantially impermeable to the transmission of solvents and fuels consisting essentially of solid polyolefins that have a linear carbon to carbon backbone structure and have a plurality of free hydrogen atoms attached to the carbon atoms with a permeability to wet solvents and fuels of less than 1/7 of the permeability of untreated enclosure members having a thickness of 1 mm, the enclosure having an inner and outer surface, at least the inner surface having a portion of the hydrogen atoms replaced by sulfonic or sulfonate groups and being subjected to a treatment with an aqueous solution comprising ferrous sulfate and phenanthroline, both in a concentration of at least 0.05 weight % at 20° C., at which at least a part of the cations of said surface has been replaced by said iron-phenanthroline complex.

2. An enclosure member according to claim 1, wherein said solid polyolefin is polyethylene.

3. An enclosure member according to claim 1, wherein a layer bearing non-neutralized sulfonic acid groups has been subjected to a treatment with an aqueous solution comprising ferrous sulfate in a concentration of 0.5 weight % and phenanthroline in a concentration of 0.5 weight %.

4. An enclosure member substantially impermeable to the transmission of solvents and fuels consisting essentially of solid polyolefins that have a linear carbon to carbon backbone structure and have a plurality of free hydrogen atoms attached to the carbon atoms with a permeability to wet solvents and fuels of less than 1/40 of the permeability of untreated enclosure members having a thickness of 1 mm, the enclosure having an inner and outer surface, at least the inner surface having a portion of the hydrogen atoms replaced by sulfonic or sulfonate groups and being subjected to a treatment with an aqueous solution comprising ferrous sulfate and phenanthroline, both in a concentration of at least 0.05 weight % at 20° C., at which at least a part of the cations of said surface has been replaced by said iron-phenanthroline complex.

5. An enclosure member according to claim 4, wherein said solid polyolefin is polyethylene.

6. A process for rendering impermeable to the transmission of wet or dry solvents, fuels, vapors and gases an enclosure member consisting essentially of solid polyolefins that have a linear carbon to carbon backbone structure and have a plurality of free hydrogen atoms attached to the carbon atoms, which process comprises treating the inner, outer or both the inner and outer surfaces of the enclosure member with sulfur trioxide, removing excess of sulfur trioxide with a stream of dry air followed by washing with an aqueous solution, then subjecting it to a treatment with an aqueous solution comprising ferrous sulfate and phenanthroline, both in a concentration of at least 0.05 weight % at 20° C.

7. A process according to claim 6 wherein said enclosure member consists of polyethylene.

8. A process according to claim 6, wherein said enclosure member bearing non-neutralized sulfonic acid groups is subjected to a treatment with an aqueous solution comprising ferrous sulfate in a concentration of 0.5 weight % and phenanthroline in a concentration of 0.5 weight %.

* * * * *